United States Patent
Nebout et al.

(10) Patent No.: US 9,633,240 B2
(45) Date of Patent: Apr. 25, 2017

(54) RFID READER/WRITER DEVICE

(71) Applicant: Schneider Electric Industries SAS, Rueil Malmaison (FR)

(72) Inventors: Jean-Marie Nebout, Garat (FR); Ernesto Gomez, Angoulême (FR); Christian Boussuge, Saint-Yrieix (FR); Arnaud Trousselier, Pranzac (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 0 days.

(21) Appl. No.: 14/867,416

(22) Filed: Sep. 28, 2015

(65) Prior Publication Data

US 2016/0110570 A1  Apr. 21, 2016

(30) Foreign Application Priority Data

Oct. 20, 2014 (FR) .................................... 14 60052

(51) Int. Cl.
*G06K 7/10* (2006.01)

(52) U.S. Cl.
CPC ..... *G06K 7/10198* (2013.01); *G06K 7/10009* (2013.01); *G06K 7/10089* (2013.01); *G06K 7/10316* (2013.01); *G06K 7/10386* (2013.01); *G06K 7/10475* (2013.01)

(58) Field of Classification Search
CPC ........... G06K 7/10009; G06K 7/10198; G06K 7/10356; G06K 7/10366; B60C 11/243; G01B 11/14; G01S 17/10; G01S 7/4865; G01S 7/497; G06F 21/35; G06F 21/575; G06F 9/4408; G07F 13/00; G08G 1/017
See application file for complete search history.

(56) References Cited

U.S. PATENT DOCUMENTS

| | | |
|---|---|---|
| 2002/0174357 A1 | 11/2002 | Davis et al. |
| 2006/0123466 A1 | 6/2006 | Davis et al. |
| 2007/0046424 A1 | 3/2007 | Davis et al. |

(Continued)

FOREIGN PATENT DOCUMENTS

| | | |
|---|---|---|
| EP | 1 760 985 A2 | 3/2007 |
| WO | WO 02/082367 A1 | 10/2002 |

OTHER PUBLICATIONS

French Preliminary Search Report issued Jun. 23, 2015 in French Application 14 60052, filed on Oct. 20, 2014 (with English Translation of Categories of Cited Documents and Written Opinion).

*Primary Examiner* — Dionne H Pendleton
(74) *Attorney, Agent, or Firm* — Oblon, McClelland, Maier & Neustadt, L.L.P.

(57) ABSTRACT

A radio frequency electronic tag reader/writer device including a housing, an antenna, a processing unit connected to the antenna and intended to exchange data with a radio frequency electronic tag presented within the range of the reader/writer device, at least one communication interface intended to be connected to a programmable logic controller and controlled by the processing unit for exchanging data with the programmable logic controller, a signalling unit for indicating one or more operating statuses, the signalling unit being connected to the processing unit, the processing unit being arranged for controlling the signalling unit on the basis of a control frame received from the programmable logic controller.

10 Claims, 1 Drawing Sheet

(56) References Cited

U.S. PATENT DOCUMENTS

| | | |
|---|---|---|
| 2010/0034375 A1 | 2/2010 | Davis et al. |
| 2013/0117814 A1 | 5/2013 | Guthery et al. |
| 2013/0117827 A1 | 5/2013 | Guthery et al. |
| 2015/0285623 A1* | 10/2015 | Tachibana .............. G01B 11/14 250/341.8 |
| 2015/0347152 A1* | 12/2015 | Pinder .................. G06F 9/4408 713/2 |
| 2015/0348343 A1* | 12/2015 | Bianco .................. G08G 1/017 340/5.2 |

* cited by examiner

| b7 | b6 | b5 | b4 | b3 | b2 | b1 | b0 | |
|----|----|----|----|----|----|----|----|----|
| 0 | 0 | 0 | 0 | 0 | 0 | 0 | 1 | T1 |
| 0 | 0 | 0 | 0 | 1 | 0 | 1 | 1 | T2 |

| b7 | b6 | b5 | b4 | b3 | b2 | b1 | b0 | |
|----|----|----|----|----|----|----|----|----|
| 0 | 0 | 0 | 0 | 0 | 0 | 0 | 1 | T10 |
| 0 | 0 | 1 | 0 | 1 | 1 | 0 | 1 | T20 |

RFID READER/WRITER DEVICE

TECHNICAL FIELD OF THE INVENTION

The present invention relates to a reader/writer device designed for wirelessly exchanging data with radio frequency electronic tags and an identification system including said device. The device will be particularly well suited for an access control application.

PRIOR ART

An RFID (Radio Frequency Identification) identification system is commonly used for identifying objects each bearing an electronic identification tag, using a reader/writer device. Within the range of the reader-writer device, the electronic tag exchanges, with the device, various information such as, for example, identification information for access control or information related to the manufacturing process in progress.

A reader/writer device comprises an antenna generating a magnetic field for powering each electronic tag passing within its range and for interacting therewith according to a predefined communication protocol. The 'passive' electronic tag is powered by the 'carrier' transmitted from the station antenna. The energy captured by the tag's antenna is converted into electrical energy and powers the internal circuitry (memory, control circuit, etc.) of said tag for the latter to store the data sent by the device and transmit the requested data to the device.

The contactless exchange of data in RFID between the device and the electronic tag is performed by an inductive technology, which is based on the use of a medium frequency electromagnetic signal (carrier). For transmitting data to the reader/writer device, the tag amplitude and/or phase modulates the carrier frequency. The reader/writer device then converts the received signal into binary language.

In many applications, the reader/writer device is connected to a programmable logic controller (PLC). In an access control application, the programmable logic controller receives, on one of its inputs, the data read in an electronic tag by the reader/writer device, verifies this data and determines the status to apply to the access means by activating or not activating one of its outputs. In parallel, the programmable logic controller controls a signalling unit separate from the reader illustrating the operating statuses of the application. The signalling unit reflects, for example, the active or inactive operating status of the programmable logic controller's output, and therefore the status of the access means.

The architecture of such a system is not always suitable for all applications, since it is too bulky and restrictive in its wiring with a signalling unit separate from the reader/writer device. In addition, it monopolises a specific processing capacity in the programmable logic controller for managing the signalling unit.

The aim of the invention is to provide a reader/writer device for implementing an identification system that is more compact, simpler to wire and reduces the processing load of the programmable logic controller.

DISCLOSURE OF THE INVENTION

This aim is achieved by a radio frequency electronic tag reader/writer device comprising:
A housing,
An antenna,
A processing unit connected to the antenna and intended to exchange data with a radio frequency electronic tag presented within the range of the reader/writer device,
At least one two-wire communication interface intended to be connected to a programmable logic controller and controlled by the processing unit for exchanging data with the programmable logic controller,
A signalling unit for indicating one or more operating statuses,
Said signalling unit being connected to the processing unit,
The processing unit being arranged for controlling said signalling unit on the basis of a control frame received from the programmable logic controller.

According to one feature, the signalling unit comprises several incorporated light indicators for being visible through several areas of the housing.

According to another feature, the communication interface is a two-wire serial interface, e.g. of the RS485 type.

The invention also concerns an identification system including a programmable logic controller and a reader/writer device as defined above, the programmable logic controller comprising a communication interface connected to the communication interface of the reader/writer device through a communication link. The system has the following features:
the programmable logic controller is arranged for sending to the reader/writer device through the communication link at least one control frame indicative of one or more operating statuses of the signalling unit,
the processing unit of the reader/writer device is arranged for reading said control frame and for controlling the signalling unit according to the data included in the control frame received.

Advantageously, the communication link is a two-wire serial link, e.g. of the RS485 type.

Preferably, the signalling unit comprises several indicators capable of taking an inactive or active status and the control frame comprises several bits each representative of the active status or the inactive status of each signalling unit indicator.

Preferably, each indicator is capable of operating according to several operating modes and the control frame comprises several bits each representative of the operating mode to apply to each signalling unit indicator.

According to another feature of the invention, the signalling unit comprises several light indicators.

According to another feature of the invention, one operating mode applied to a light indicator is of the flashing type.

BRIEF DESCRIPTION OF THE FIGURES

Other features and advantages will appear in the detailed description that follows made with reference to the accompanying drawings in which.

DETAILED DESCRIPTION OF AT LEAST ONE EMBODIMENT

Figures 1, 2A, 2B:
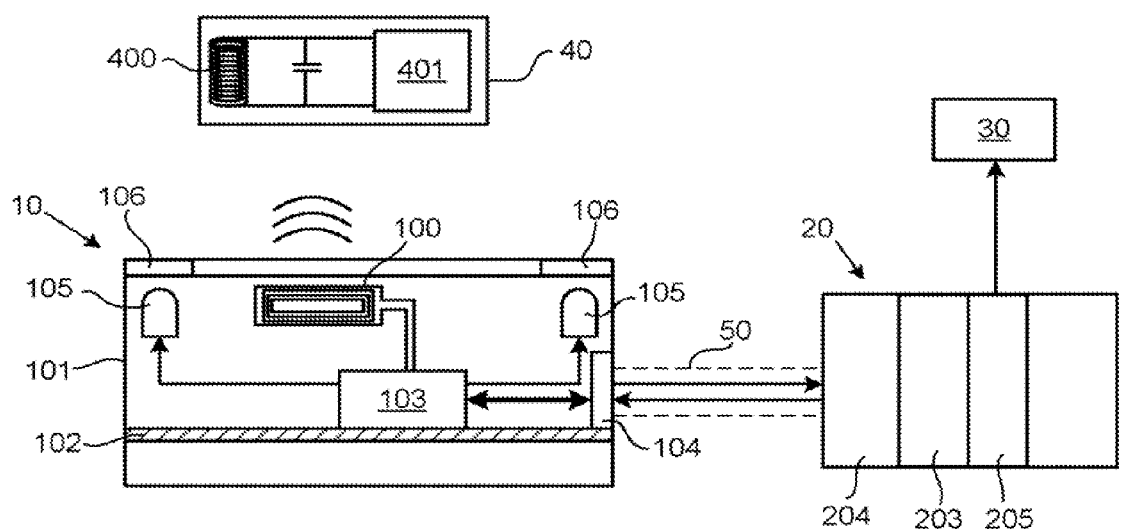
FIG. 1 represents the identification system of the invention, including the reader/writer device of the invention and the programmable logic controller.
FIGS. 2A and 2B represent two architecture variants of the control frame transmitted by the programmable logic controller, to the reader/writer device, for controlling the signalling unit.

The invention concerns an identification system including an electronic tag reader/writer device 10 and a programmable logic controller 20.

In the present application, the term 'reader/writer device' should be understood as covering a reading device capable only of reading data stored in an electronic tag or a reading and writing device capable of both reading data stored in an electronic tag and writing data into an electronic tag.

The contactless exchange of data between the reader/writer device 10 and an electronic tag 40 presented within its range is performed by RFID which is an inductive technology based on the use of a medium frequency electromagnetic signal (carrier) for the contactless transmission of information between the device and electronic tags.

RFID technology is well known. In general, an RFID reader/writer device 10 has an antenna 100 formed by an oscillating circuit in which a magnetic field may be created or captured that enables wireless communication, via magnetic coupling (also called inductive coupling), with any oscillating circuit placed in an interaction area of the device, e.g. with the antenna 400 of an electronic tag 40. Generally, binary data are exchanged between the device 10 and an electronic tag 40 by amplitude and/or phase modulation of the magnetic signal's carrier frequency.

An electronic tag 40 is thus capable of receiving a radio signal and sending back a different signal in response containing relevant information. It has a memory for storing various identification, recognition and/or process information, and notably a unique identifier. Some tags are only accessible for reading by the reader/writer device while others are accessible for both reading and writing.

Moreover, in the case of a 'passive' electronic tag 40, the electromagnetic signal (carrier) created by the antenna 100 of the reader/writer device 10 is used to electrically power the tag when it is in the interaction area of the device. The energy captured by the tag's antenna is actually converted into electrical energy for powering the internal circuitry (memory, processing unit, etc.) of this tag. Being powered with the energy produced by the electromagnetic field of the reader/writer device, the tag therefore has the advantage of not needing any internal power supply such as a cell or a battery.

The reader/writer device 10 comprises a housing 101. The housing 101 of the reader/writer device contains at least one printed circuit board 102 hosting a processing unit 103 and a communication interface 104 for communicating with the programmable logic controller 20. The processing unit 103 notably comprises a microcontroller having a memory. According to the invention, the reader/writer device 10 comprises a signalling unit that may comprise, for example, one or more indicators, such as light indicators 105, e.g. light-emitting diodes, audible or vibrating indicators. The light indicators 105 are visible from outside the device through the transparent or translucent areas 106 of the housing 101. The signalling unit is connected to the processing unit 103 of the reader/writer device 10. The processing unit 103 of the reader/writer device 10 is arranged for controlling a change of status of each signalling unit indicator. The link between the processing unit 103 and the signalling unit is preferably a peer-to-peer link (as in FIG. 1) but a multipoint bus solution with specific addressing could be envisaged. For controlling each signalling unit indicator, the microcontroller of the processing unit 103 is arranged for generating signals for activating control relays positioned on the electrical power supply circuits of the indicators. Of course, the reader/writer device 10 comprises an electrical power supply unit connected to a power source and arranged to supply its components, notably its processing unit 103 and its signalling unit. The electrical power supply unit is connected via the communication interface 104.

As described previously, the reader/writer device 10 also comprises an antenna 100 that is connected to the processing unit 103 of the device. The antenna 100 may be accommodated in the housing (as in FIG. 1) or separate from it and connected to the processing unit 103 by a cable (known variant but not represented). The antenna 100 cooperates with the processing unit 103 of the reader/writer device 10 for contactlessly exchanging data, according to inductive technology or RFID, with electronic tags 40 that are presented thereto. The antenna 100 of the reader/writer device generates a magnetic field for powering the electronic tags 40 passing within its range and enables the device 10 to interact therewith.

An electronic tag 40 in its turn comprises an antenna 400 consisting of an LC oscillating circuit and electronic circuitry 401 including notably a memory and data processing means for interpreting the requests sent by the reader/writer device 10 and for sending the requested data. The electronic tag 40 is powered by the 'carrier' transmitted from the antenna 100 of the reader/writer device 10 as soon as it enters the range of the reader/writer device. The energy captured by the antenna 400 of the tag 40 is converted into electrical energy and powers the internal circuitry 401 of the tag. The electronic tag stores data and transmits the data requested to the reader/writer device.

The programmable logic controller 20 is connected to the reader/writer device 10. It comprises a processing module 203 and a communication module 204 for exchanging data with the reader/writer device through a communication link 50. Through this communication link 50, the programmable logic controller 20 notably receives the data read in an electronic tag 40 presented within the range of the reader/writer device 10. The programmable logic controller 20, using its processing module 203, verifies the data received. After this data has been verified, the programmable logic controller 20 sends or does not send a signal on one of its output modules 205 to which, for example, an actuator 30 is connected. It may involve, for example, a latch control signal for an access control application.

Advantageously, the communication interface 104, the communication module 204 and the communication link 50 operate according to a serial protocol. The communication interface 104 and the communication module 204 are, for example, of the RS232 or RS485 type. The connectors used on the reader/writer device 10 for connecting to the programmable logic controller are, for example, of the M12 type. The exchange of data between the reader/writer device and the programmable logic controller, notably the data read by the reader/writer device 10 in an electronic tag, is performed through the serial communication link. The communication link between the programmable logic controller 20 and the reader/writer device is a two-wire one.

The processing module 203 of the programmable logic controller 20 is also arranged for generating and controlling the transmission of a control frame Tj from the signalling unit to the device reader/writer device 10. The control frame Tj is transmitted by the programmable logic controller 20 to the reader/writer device 10 through the communication link 50, via the communication module 204 and the communication interface 104.

According to the invention, this control frame Tj (j is between 1 and n) is transmitted over the predefined communication link 50. It is received by the processing unit 103 of the reader/writer device 10 and interpreted by the latter for controlling the on or off status of each signalling unit indicator and optionally for assigning a particular operating mode to each of the indicators. The microcontroller of the processing unit 103 acts, for example, on signalling unit indicator control relays. This control frame is transmitted on the two wires of the communication link 50, in the same way as the other data exchanged between the reader/writer device 10 and the programmable logic controller 20, i.e. any other control frame originating from the programmable logic controller or the frames intended to report the status of the detection performed by the device 10.

As represented in FIGS. 2A and 2B, the control frame comprises several bits bi (i is between 0 and x−1, where x is the number of indicators of the device), each representative of the active or inactive status of a signalling unit indicator. In addition, if some indicators are capable of having different operating modes, the frame Tj also comprises several bits bi (i ranging from x to y) representative of a particular operating mode to be assigned to one or more signalling unit indicators. For a light indicator, one operating mode is, for example, the flashing mode. Several operating modes of the flashing type, differing from each other by their flashing rate, may also be provided. The sequencing of status data and operating mode in the frame may, of course, be different. The bits bi may have, for example, even i for the status of the indicator and odd i for the operating mode of the indicator.

In FIGS. 2A and 2B, each row of the tables represents a separate control frame transmitted by the programmable logic controller 20 to the processing unit 103 of the reader/writer device 10, via the communication link 50.

In the configuration of FIG. 2A, the signalling unit only comprises two light indicators of different colours. In the first control frame T1 transmitted, the first bit b0, representative of the status of the first indicator, is set to the value 1 corresponding to the first indicator being switched on and the other bits (b1, b2, b3, . . . ) of the frame are set to the value 0. In the second control frame T2 transmitted, the first bit b0, representative of the status of the first indicator, is set to the value 1 and the second bit b1, representative of the status of the second indicator is set to the value 1, thus ordering each of them to be switched on. Furthermore, the fourth bit b3 is also set to the value 1, controlling a particular operating mode of the second indicator, e.g. a flashing operating mode at a specified frequency.

FIG. 2B illustrates an operation with a signalling unit including a light indicator of the RGB (Red, Green, Blue) type the colour of which is determined by the combination of the colours of several light-emitting diodes. In the first frame T10, since only the first bit is set to the value 1, the light indicator will be red. In the second frame, the first bit and the third bit are set to the value 1, the light indicator will therefore be purple (mixture of red and blue). Since the fourth bit and the sixth bit are also set to the value 1, the flashing operating mode is ordered for both diodes, resulting in a flashing purple light.

It should also be noted that the signalling unit of the reader/writer device may comprise some indicators (not represented) the statuses of which are controlled only by the reader/writer device 10 and not by the programmable logic controller 20, as described above in the invention. The statuses of these indicators result, for example, from internal diagnostics performed by the reader/writer device 10.

The invention offers several advantages, including:
Since the control frame Tj is transmitted over the serial link by the programmable logic controller 20 to the reader/writer device 10, which is then responsible for controlling each indicator, the processing load is thus shifted from the programmable logic controller 20 to the reader device 10, notably the management of flashing operating modes.

The use of the serial communication link 50, already used for exchanging data between the reader/writer device 10 and the programmable logic controller 20, does not monopolise any specific output of the programmable logic controller 20 by indicator.

The control frame Tj may be added onto a more general frame for exchanging data from the programmable logic controller 20 to the reader/writer device 10.

The invention claimed is:

1. A radio frequency electronic tag reader/writer device comprising:
    a housing,
    an antenna included in the housing,
    a processing circuit included in the housing and connected to the antenna, the processing circuit being configured to exchange data with a radio frequency electronic tag presented within range of the reader/writer device,
    at least one two-wire communication interface included in the housing and configured to be connected to a programmable logic controller external to the housing, and controlled by the processing circuit to exchange data with the programmable logic controller via the at least one two-wire communication interface,
    a signaling circuit included in the housing and configured to indicate one or more operating statuses,
    wherein:
    said signaling circuit is connected to the processing circuit,
    the processing circuit is configured to control said signalling circuit based on a control frame received from the programmable logic controller over said communication interface.

2. The reader device according to claim 1, wherein the signalling circuit includes several incorporated light indicators configured to be through corresponding areas of the housing.

3. The reader device according to claim 1, wherein the communication interface is serial.

4. An identification system comprising: a programmable logic controller and a reader/writer device as defined in claim 1, the programmable logic controller comprising a communication interface connected to the communication interface of the reader/writer device through a two-wire communication link, wherein:
    the programmable logic controller is configured to send to the reader/writer device through the communication link at least one control frame indicative of one or more operating statuses of the signalling circuit,
    the processing circuit of the reader/writer device is configured to read said control frame and to control the signalling circuit according to data included in the control frame received.

5. The system according to claim 4, wherein the communication link is of a two-wire serial type.

6. The system according to claim 4, wherein the signalling circuit includes several indicators configured to take an inactive or an active status and the control frame includes several bits each representative of the active status or the inactive status of each indicator included in the signalling circuit.

7. The system according to claim 6, wherein each indicator is configured to operate according to several operating modes and the control frame includes several bits each representative of the operating mode to be applied to each indicator included in the signalling circuit.

8. The system according to claim 7, wherein the signalling circuit includes several light indicators.

9. The system according to claim 8, wherein one operating mode applied to a light indicator is of the flashing type.

10. The reader device according to claim 1, wherein the processing circuit is directly connected to the antenna.

* * * * *